US009258337B2

(12) United States Patent
Hyndman (10) Patent No.: US 9,258,337 B2
(45) Date of Patent: Feb. 9, 2016

(54) INCLUSION OF WEB CONTENT IN A VIRTUAL ENVIRONMENT

(75) Inventor: Arn Hyndman, Ottawa (CA)

(73) Assignee: AVAYA INC., Basking Ridge, NJ (US)

( * ) Notice: Subject to any disclaimer, the term of this patent is extended or adjusted under 35 U.S.C. 154(b) by 728 days.

(21) Appl. No.: 12/344,473

(22) Filed: Dec. 27, 2008

(65) Prior Publication Data

US 2009/0241037 A1  Sep. 24, 2009

Related U.S. Application Data

(60) Provisional application No. 61/037,447, filed on Mar. 18, 2008.

(51) Int. Cl.
*G06F 3/048* (2013.01)
*H04L 29/06* (2006.01)
*H04M 3/42* (2006.01)

(52) U.S. Cl.
CPC ............ *H04L 65/4015* (2013.01); *H04L 67/38* (2013.01); *H04M 3/42221* (2013.01); *H04M 2201/22* (2013.01); *H04M 2203/301* (2013.01)

(58) Field of Classification Search
CPC ...................................... G06F 3/048
USPC ................................. 715/760, 757
See application file for complete search history.

(56) References Cited

U.S. PATENT DOCUMENTS 6,175,842 B1   1/2001  Kirk et al.
6,230,171 B1 *  5/2001  Pacifici et al. ................ 715/201
6,909,429 B2   6/2005  Gottesman et al.
6,954,728 B1  10/2005  Kusumoto et al.
(Continued)

FOREIGN PATENT DOCUMENTS

JP   2003-216557 A   7/2002
JP   2007-156558 A   6/2007
(Continued)

OTHER PUBLICATIONS

Written Opinion of the International Searching Authority from corresponding PCT application PCT/CA2009/000329.
(Continued)

*Primary Examiner* — Tadeese Hailu
*Assistant Examiner* — Darrin Hope
(74) *Attorney, Agent, or Firm* — Anderson Gorecki & Rouille LLP (57) ABSTRACT

A virtual environment server records and broadcasts a Uniform Resource Locator (URL), browser state information, and optionally clipping parameters, that are to be associated with a three dimensional (3D) surface in a virtual environment. When a user's Avatar encounters the 3D surface in the virtual environment, the client obtains the URL and browser state information, and obtains the web content using a standard web browser. The web content is stored into an off-screen buffer. The content from the off-screen buffer is then rendered locally as a texture map onto the 3D surface of the virtual environment. Whenever one of the users interacts with the web content, a new URL and new browser state information is used to obtain the updated web content in the same way. The new URL and new browser state information is also passed from the client to the server, so that the server may update the URL and new browser state information in each of the other clients associated with each of the other users.

11 Claims, 3 Drawing Sheets

(56) References Cited

U.S. PATENT DOCUMENTS

| | | | |
|---|---|---|---|
| 7,139,984 B2 | 11/2006 | Beaumont et al. | |
| 2001/0019337 A1* | 9/2001 | Kim | 345/757 |
| 2002/0095463 A1* | 7/2002 | Matsuda | 709/205 |
| 2003/0149731 A1 | 8/2003 | Ohwa | |
| 2003/0197737 A1* | 10/2003 | Kim | 345/781 |
| 2005/0086612 A1* | 4/2005 | Gettman et al. | 715/848 |
| 2005/0191039 A1* | 9/2005 | Matsuda | 386/117 |
| 2007/0282695 A1 | 12/2007 | Toper et al. | |
| 2008/0204449 A1 | 8/2008 | Dawson et al. | |

FOREIGN PATENT DOCUMENTS

| | | |
|---|---|---|
| WO | WO 01/84501 | 11/2001 |
| WO | WO2005/015880 | 2/2005 |
| WO | WO2009/000028 | 1/2008 |

OTHER PUBLICATIONS

Office Action from related Japanese Patent Application 2011-500018.

Office Action dated Mar. 7, 2013 from related European Patent Application 09722039.6.

S. Zhang, et al., "A Data-driven 3D Animation System for Tele-Rehabilitation," IEEE International Conference on Mechatronics and Automation, ICMA 2007, pp. 2166-2171, Aug. 1, 2001.

F. Bernardini, et al. "Pervasive 3D viewing for product data management", IEEE Computer Graphics and Applications, vol. 23, No. 2, pp. 14-19, Mar. 1, 2003.

D. Xinyu, et al., "Concept and Application of Three Dimensional Virtual Study Technology for Academic e-Learning", IEEE International Conference on Computer Science and Information Technology, 2008, pp. 741-744, Aug. 29, 2008.

* cited by examiner

INCLUSION OF WEB CONTENT IN A VIRTUAL ENVIRONMENT

CROSS-REFERENCE TO RELATED APPLICATIONS

This application claims priority to U.S. Provisional Patent Application No. 61/037,447, filed Mar. 18, 2008, entitled "Method and Apparatus For Providing 3 Dimensional Audio on a Conference Bridge", the content of which is hereby incorporated herein by reference.

BACKGROUND OF THE INVENTION

1. Field of the Invention

The present invention relates communication sessions and, more particularly, to a method and apparatus for including web content in a virtual environment.

2. Description of the Related Art

Virtual environments simulate actual or fantasy 3-D environments and allow for many participants to interact with each other and with constructs in the environment via remotely-located clients. One context in which a virtual environment may be used is in connection with gaming, although other uses for virtual environments are also being developed.

In a virtual environment, an actual or fantasy universe is simulated within a computer processor/memory. Multiple people may participate in the virtual environment through a computer network, such as a local area network or a wide area network such as the Internet. Each player selects an "Avatar" which is often a three-dimensional representation of a person or other object to represent them in the virtual environment. Participants send commands to a virtual environment server that controls the virtual environment to cause their Avatars to move within the virtual environment. In this way, the participants are able to cause their Avatars to interact with other Avatars and other objects in the virtual environment.

A virtual environment often takes the form of a virtual-reality three dimensional map, and may include rooms, outdoor areas, and other representations of environments commonly experienced in the physical world. The virtual environment may also include multiple objects, people, animals, robots, Avatars, robot Avatars, spatial elements, and objects/environments that allow Avatars to participate in activities. Participants establish a presence in the virtual environment via a virtual environment client on their computer, through which they can create an Avatar and then cause the Avatar to "live" within the virtual environment.

As the Avatar moves within the virtual environment, the view experienced by the Avatar changes according to where the Avatar is located within the virtual environment. The views may be displayed to the participant so that the participant controlling the Avatar may see what the Avatar is seeing. Additionally, many virtual environments enable the participant to toggle to a different point of view, such as from a vantage point outside of the Avatar, to see where the Avatar is in the virtual environment.

The participant may control the Avatar using conventional input devices, such as a computer mouse and keyboard. The inputs are sent to the virtual environment client which forwards the commands to one or more virtual environment servers that are controlling the virtual environment and providing a representation of the virtual environment to the participant via a display associated with the participant's computer.

Depending on how the virtual environment is set up, an Avatar may be able to observe the environment and optionally also interact with other Avatars, modeled objects within the virtual environment, robotic objects within the virtual environment, or the environment itself (i.e. an Avatar may be allowed to go for a swim in a lake or river in the virtual environment). In these cases, client control input may be permitted to cause changes in the modeled objects, such as moving other objects, opening doors, and so forth, which optionally may then be experienced by other Avatars within the virtual environment.

"Interaction" by an Avatar with another modeled object in a virtual environment means that the virtual environment server simulates an interaction in the modeled environment, in response to receiving client control input for the Avatar. Interactions by one Avatar with any other Avatar, object, the environment or automated or robotic Avatars may, in some cases, result in outcomes that may affect or otherwise be observed or experienced by other Avatars, objects, the environment, and automated or robotic Avatars within the virtual environment.

A virtual environment may be created for the user, but more commonly the virtual environment may be persistent, in which it continues to exist and be supported by the virtual environment server even when the user is not interacting with the virtual environment. Thus, where there is more than one user of a virtual environment, the environment may continue to evolve when a user is not logged in, such that the next time the user enters the virtual environment it may be changed from what it looked like the previous time.

Virtual environments are commonly used in on-line gaming, such as for example in online role playing games where users assume the role of a character and take control over most of that character's actions. In addition to games, virtual environments are also being used to simulate real life environments to provide an interface for users that will enable on-line education, training, shopping, business collaboration, and other types of interactions between groups of users and between businesses and users.

As Avatars encounter other Avatars within the virtual environment, the participants represented by the Avatars may elect to communicate with each other. For example, the participants may communicate with each other by typing messages to each other or an audio bridge may be established to enable the participants to talk with each other.

There are times when it would be advantageous for web content to be displayed within the virtual environment. For example, if the virtual environment is used in a retail capacity, it may be desirable to display web content about particular products within the virtual environment. Unfortunately, virtual environment engines are typically engineered with the assumptions that textures (bitmaps on 3D surfaces) do not change regularly. Thus, although the web content may be mapped to a surface as a texture, updating the content and enabling users to interact with the content is challenging.

In a business context, where the three dimensional virtual environment is being used for business collaboration, it is important for the users to have a consistent view of the virtual environment. It is difficult for people to collaborate if they are looking at different things. Where web content is to be included in the virtual environment, it therefore is important that the same web content be shown to all viewers.

One way to include web content is to manually convert the web content into a static two dimensional texture, and then distribute the texture to the multiple users of the three dimensional computer-generated virtual environment. This solution is reasonably bandwidth efficient, as the static texture can easily be cached at each client. However, it must be manually updated and does not provide interaction by the users. Specifically, since the content is static, the users cannot interact with the web content, for example to access links to other regions of the web site.

Another way to include web content is to render the web content dynamically at the server, and push the result out to the users as a 2D texture. This solution solves the manual update problem mentioned above, but still does not enable the users to interact with the web pages. Also, since the web content is dynamically rendered, the bandwidth requirements may be slightly higher than where the web content is manually converted. Additionally, the web content is typically rendered in the server using a custom renderer, which may not support all the features of a consumer browser. Thus, the type of content that may be included, such as FLASH video and other content that is typically supported by plugins in customer web browsers, may be limited.

A third way to include web content is to map the content directly to the 3D surfaces. This solution enables each user to interact with the content, for example by clicking on links on the web content, to cause new content to be provided on the 3D surface. Unfortunately, mapping applications to the 3D surfaces of the virtual environment is extremely bandwidth intensive. Specifically, the server will need to render the web content on the surface and push the new content out to each of the users in the vicinity of the surface. This will need to be performed each time the content changes and, for content such as full motion video, may consume considerable bandwidth. Additionally, since the content may be controlled by any of the users of the virtual environment, the server will need to implement a way to mediate who gets control when more than one user tries to manipulate the application at the same time. Accordingly, it would be advantageous to provide a new way to enable web content to be included in a virtual environment.

SUMMARY OF THE INVENTION

A virtual environment server records and broadcasts a Uniform Resource Locator (URL), and optionally clipping parameters, that are to be associated with a three dimensional (3D) surface in a virtual environment. When a user's Avatar encounters the 3D surface in the virtual environment, the client obtains the URL and obtains the web content using a standard web browser. The web content is rendered locally in an off-screen buffer. The content from the off-screen buffer is then rendered locally as a texture map onto the 3D surface of the virtual environment. Users can interact with the web content on the 3D surface, such as by selecting links and other objects on the web pages. Whenever one of the users interacts with the web content, for example by clicking on a link in the web content, the new URL is used to render the new web content to the off-screen buffer and then from the buffer to the 3D surface. The new URL and associated browser state such as cookies, JavaScript variables, Java, FLASH and other plug-in state, is also passed from the client to the server, so that the server may update the URL and browser state in each of the other clients associated with each of the other users. Each user's web browser will obtain the web content for the new URL and use the browser state to render the same content. Synchronizing cookies will allow a single user's account/session to be used in a co-browsing session. However, not all web applications will work with synchronized cookies and, accordingly, this option may be disabled if desired. By causing each user to locally obtain the web content, and locally render the web content, the amount of bandwidth required to implement the shared application is reduced considerably. By enabling the server to synchronize the URL and web browser state to each of the clients, each user will see the same web content.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
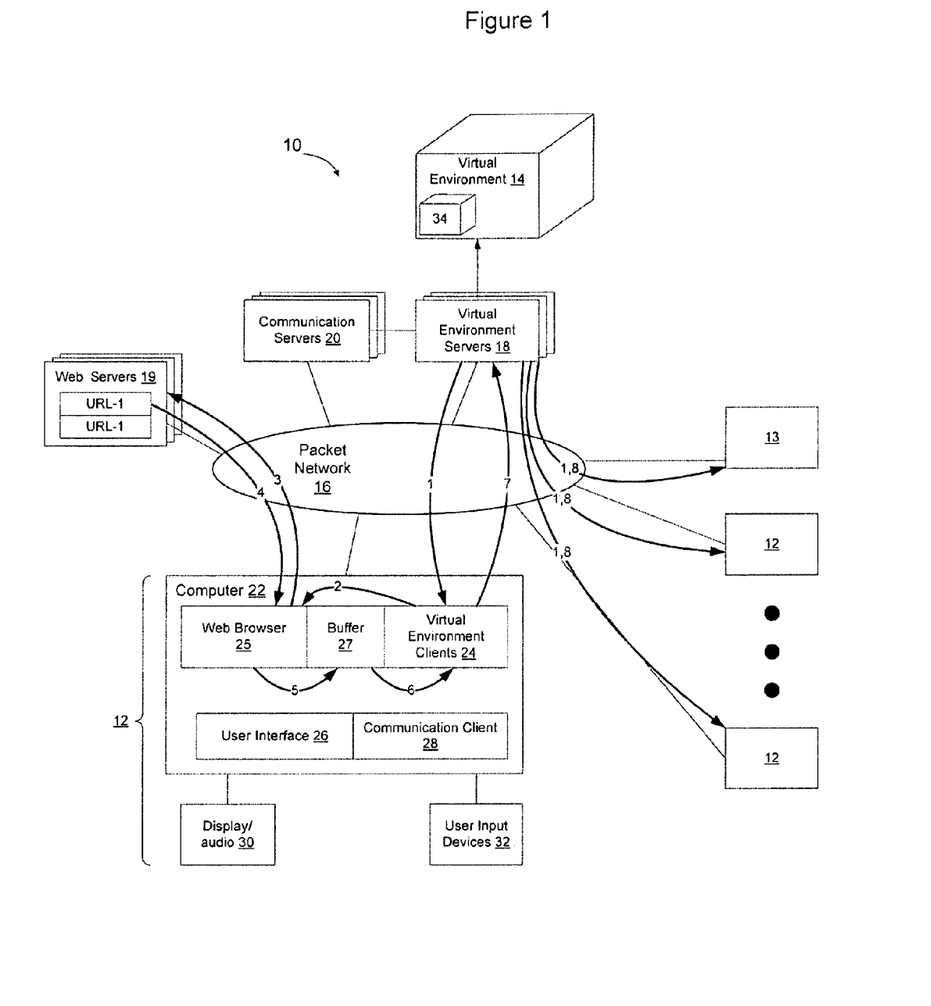
FIG. 1 is a functional block diagram of a portion of an example system enabling application output such as web browser content to be shared in a three dimensional computer-generated virtual environment according to an embodiment of the invention.

FIG. 1 shows a portion of an example system 10 that may enable application output such as web content of a web browser to be shared in a three dimensional computer-generated virtual environment. In the example shown in FIG. 1, a user 12 may access the virtual environment 14 from their computer 22 over a packet network 16 or other common communication infrastructure. The virtual environment 14 is implemented by one or more virtual environment servers 18. Communication sessions between the users 12 may be implemented by one or more communication servers 20.

The virtual environment may be implemented as using one or more instances, each of which may be hosted by one or more virtual environment servers. Where there are multiple instances, the Avatars in one instance are generally unaware of Avatars in the other instance. Conventionally, each instance of the virtual environment may be referred to as a separate World. Avatars in a given world are allowed to communicate with other users that also have Avatars in the same world over a communication session hosted by the communication server 20.

The virtual environment 14 may be any type of virtual environment, such as a virtual environment created for an on-line game, a virtual environment created to implement an on-line store, a virtual environment created to implement an on-line training facility, for business collaboration, or for any other purpose. Virtual environments are being created for many reasons, and may be designed to enable user interaction to achieve a particular purpose. Example uses of virtual environments include gaming, business, retail, training, social networking, and many other aspects.

Generally, a virtual environment will have its own distinct three dimensional coordinate space. Avatars representing users may move within the three dimensional coordinate space and interact with objects and other Avatars within the three dimensional coordinate space. The virtual environment servers maintain the virtual environment and generate a visual presentation for each user based on the location of the user's Avatar within the virtual environment. The view may also depend on the direction in which the Avatar is facing and the selected viewing option, such as whether the user has opted to have the view appear as if the user was looking through the eyes of the Avatar, or whether the user has opted to pan back from the Avatar to see a three dimensional view of where the Avatar is located and what the Avatar is doing in the three dimensional computer-generated virtual environment.

Each user 12 has a computer 22 that may be used to access the three-dimensional computer-generated virtual environment. The computer 22 will run a virtual environment client 24 and a user interface 26 to the virtual environment. The user interface 26 may be part of the virtual environment client 24 or implemented as a separate process. A separate virtual environment client may be required for each virtual environment that the user would like to access, although a particular virtual environment client may be designed to interface with multiple virtual environment servers. A communication client 28 is provided to enable the user to communicate with other users who are also participating in the three dimensional computer-generated virtual environment. The communication client may be part of the virtual environment client 24, the user interface 26, or may be a separate process running on the computer 22.

The user may see a representation of a portion of the three dimensional computer-generated virtual environment on a display/audio 30 and input commands via a user input device 32 such as a mouse, touch pad, or keyboard. The display/audio 30 may be used by the user to transmit/receive audio information while engaged in the virtual environment. For example, the display/audio 30 may be a display screen having a speaker and a microphone. The user interface generates the output shown on the display under the control of the virtual environment client, and receives the input from the user and passes the user input to the virtual environment client. The virtual environment client passes the user input to the virtual environment server which causes the user's Avatar 34 or other object under the control of the user to execute the desired action in the virtual environment. In this way the user may control a portion of the virtual environment, such as the person's Avatar or other objects in contact with the Avatar, to change the virtual environment for the other users of the virtual environment.

Typically, an Avatar is a three dimensional rendering of a person or other creature that represents the user in the virtual environment. The user selects the way that their Avatar looks when creating a profile for the virtual environment and then can control the movement of the Avatar in the virtual environment such as by causing the Avatar to walk, run, wave, talk, or make other similar movements. Thus, the block 34 representing the Avatar in the virtual environment 14, is not intended to show how an Avatar would be expected to appear in a virtual environment. Rather, the actual appearance of the Avatar is immaterial since the actual appearance of each user's Avatar may be expected to be somewhat different and customized according to the preferences of that user. Since the actual appearance of the Avatars in the three dimensional computer-generated virtual environment is not important to the concepts discussed herein, Avatars have generally been represented herein using simple geometric shapes or two dimensional drawings, rather than complex three dimensional shapes such as people and animals.

Figure 2:
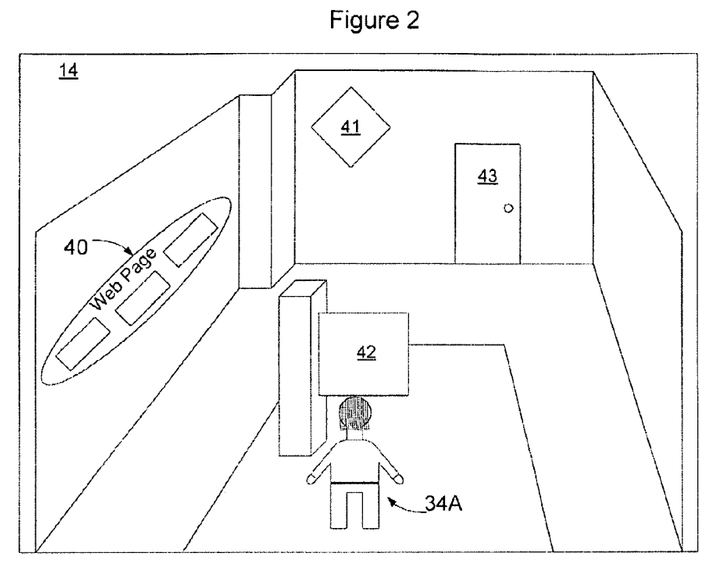
FIG. 2 is a functional block diagram of an example three dimensional computer-generated virtual environment.
Figure 3:
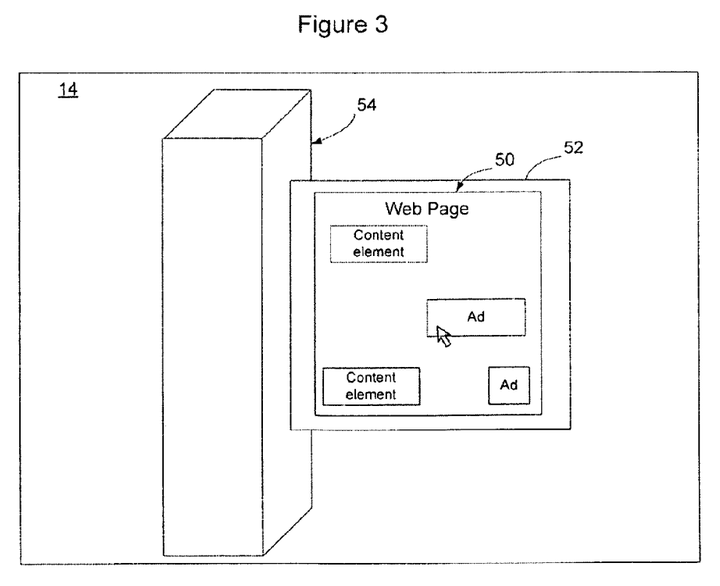
FIGS. 3 and 4 show examples of how an application display such as a web browser application may be mapped to a three dimensional surface of a three dimensional computer-generated virtual environment.
Figure 4:
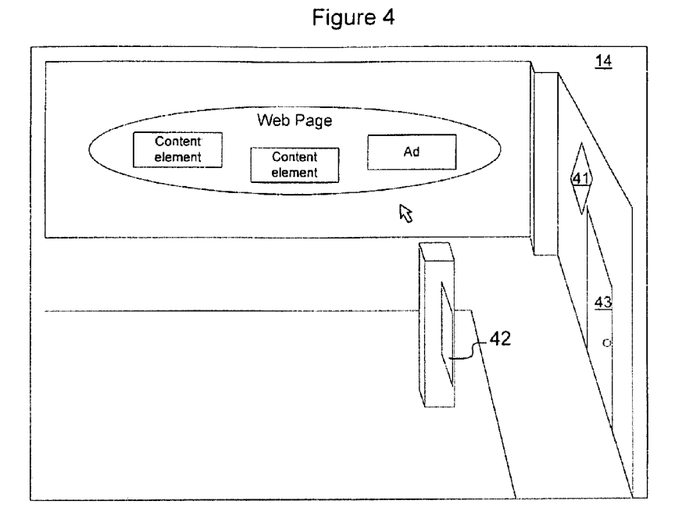

FIG. 2 shows an example three dimensional computer-generated virtual environment. In the example shown in FIG. 2, an Avatar 34A is shown standing in front of a sign 42 that is attached to a post. The user may use the user interface 26 to cause the Avatar to walk around within the virtual environment to approach objects within the virtual environment. For example, the user may cause the Avatar to walk up to the sign 42 as shown in FIG. 3, may cause the Avatar to walk over to the oval shaped window 40 (FIG. 4), to move to the window 41, door 43, or to move elsewhere in the virtual environment. The user may be presented with a view of the virtual environment that is set back from the Avatar (as shown in FIG. 2) to see where the Avatar is located within the virtual environment. Alternatively, the user may be presented with a view that represents what the Avatar is seeing in the virtual environment, as if the user were looking through the Avatar's eyes into the virtual environment (FIGS. 3 and 4).

In the example shown in FIG. 2 there is only one Avatar (Avatar 34A) shown in the illustrated portion of the virtual environment for sake of clarity. Virtual environments may be used by hundreds or thousands of users simultaneously, which makes them ideal for sharing information and ideas between users. Additionally, according to an embodiment of the invention, external content may be included in the virtual environment to enable the external content to be shared by the users as well. This increases the utility of the virtual environment, since content from external sources to be brought into the virtual environment, shared, and manipulated in such a way that all of the users in the vicinity of the content will see the manipulations and have a similar view of the content in the virtual environment. The content may be static content, such as a web page, may be dynamic content such as a FLASH video, or may other type of content. Since the content is received locally, it may be supported by plugins at the user's browser so that the type of content is not limited by technical limitations of the server. By sharing browser state information as well, the users of the virtual environment may see synchronized views of the web content.

FIG. 3 shows an example web page 50 that has been rendered onto a three dimensional surface 52 in the virtual environment 14. The three dimensional surface 52 in this example resembles a sign attached to a post. FIG. 4 shows another example where the three dimensional surface resembles an oval-shaped billboard attached to a wall.

The virtual environment server may associate a URL with any desired surface in the virtual environment. Rather than mapping a texture to the three dimensional surface, the server can associate a URL with the surface and, optionally, a default texture. The virtual environment server may also include an initial set of cookies, JavaScript variables, Java, FLASH, and other plug-in state information that should be associated with the URL. The additional state information allows the users of the virtual environment that are viewing the web content to have synchronized views of the web content.

The virtual environment server may also associate clipping parameters to provide the client with information as to the size of the available surface and how the content from the web page should be formatted when being rendered in the virtual environment. The virtual environment server may specify other attributes associated with the surface, such as who is able to see the content associated with the surface, which Avatars can interact with the content, whether an Avatar needs to have a particular tool such as a virtual laser pointer to interact with the content, or any other restrictions that are to be placed on the content.

According to an embodiment of the invention, as web content or other application generated content is received by the client, it will be mapped to one or more three dimensional surfaces in the three dimensional computer-generated virtual environment. The Avatars/users can view the content and interact with the content. Interactions of one user will be processed and viewed by all of the other Avatars. In this manner, applications may be shared within the three dimensional computer-generated virtual environment. Since the virtual environment server transmits URLs and browser state rather than the web content, the amount of bandwidth required by the virtual environment server to include the web content may be minimized.

The virtual environment server may wish to restrict the content such that only one person may interact with the content at a time. To do this, the virtual environment server may enable users to "check out" content by clicking on the content to select the content and clicking a second time on the content to de-select the content. When a client elects to check out content, that client is responsible for issuing commands to update the content as desired until they cede control over the content. Many ways of implementing restrictions over who can control content in the virtual environment and how control is to be shared in the virtual environment may be implemented depending on the policy to be implemented in the virtual environment.

FIG. 3 shows the view an Avatar would see when standing directly in front of the sign 52. In this view, the three dimensional surface 52 appears flat. FIG. 4 shows a view of the same sign that an Avatar may see if the Avatar were looking at the sign from a different perspective. From this angle, the sign does not appear the same to the Avatar. Rather, the Avatar is looking at the sign from an angle, which is close to looking at the sign from one edge. The Avatar has a similar perspective in connection with the oval-shaped billboard 40. For example, from the vantage point in FIG. 2, the oval-shaped billboard appears smaller and appears to extend at an angle into the three dimensional environment. When the user moves around to the perspective shown in FIG. 4, however, the oval-shaped billboard appears to be flat and directly in front of the user. As used herein, the term "3D surface" will refer to ANY surface in a three dimensional virtual environment, regardless of whether the surface is a flat two dimensional planar surface, or is shaped in another three dimensional manner in the virtual environment. For example, rather than rendering the web content onto the sign 52, the web content could have been rendered on to several sides of the post 54.

FIG. 1 includes several arrows (labeled 1 through 8) that show an example process that may be used to enable applications to be shared in the virtual environment. In the example shown in FIG. 1, assume that the virtual environment is to include web content available from a web server 19. It will be assumed that the web content is available via URL 1 on the web server 19.

To enable the web content to be available in the virtual environment, the virtual environment server will render the environment and associate the URL (URL-1) and browser state with a particular area of the virtual environment. For example, URL-1 may be associated with the billboard 40 or the sign 42 in the virtual environment shown in FIG. 2. The virtual environment parameters, including the URL (URL-1) will be transmitted to each of the users (Arrows 1).

The virtual environment client 24 will render the virtual environment for the user. The virtual environment client will also determine which URLs are contained within the virtual environment and will pass the URLs to a web browser 25 on the user's computer (Arrow 2). In connection with this, the virtual environment client will also determine whether there is any browser state information associated with the URL and, if so, will pass the browser state information to the web browser along with the URL.

Upon receipt of the URL, the web browser 25 will obtain the content associated with the URL from web server 19. Specifically, the web browser will send a request for the content (Arrow 3) and receive the content (Arrow 4). The web browser may request the URLs as the Avatar encounters surfaces in the virtual environment or, alternatively, may request the URLs at a different point in time. For example, the web browser may be prompted to request content associated with URLs within a particular radius of the Avatar in the virtual environment, all URLs within a particular volume, within a set of volumes, or in some other manner.

When the web browser receives the content, it will render the content into a buffer 27 (Arrow 5). Storing the content in the buffer 27 makes the content available to be included in the virtual environment if necessary. When the user's Avatar is in the vicinity of an area that is associated with a URL, the virtual environment client will retrieve the content from the buffer 27 (Arrow 6) and render it onto the appropriate three dimensional surface in the user's view of the virtual environment.

In connection with obtaining the content or rendering the content, the web browser will use the browser state that was retrieved along with the URL so that all users viewing a particular URL have synchronized state such as synchronized cookies. Examples of browser state include the URL of the page being displayed, a set of cookies (essentially name value pairs) associated with the domain of the web page being displayed, JavaScript variables, and Java, FLASH, and other plug-in state. To get a perfectly synchronized web display on each client computer, all of these state items would need to be synchronized. The invention is not limited to an embodiment that achieves perfect synchronization. Rather, the particular implementation will depend on the complexity of the state to be exchanged. Thus, if it is impractical to achieve perfect synchronization, the amount of synchronization may be traded off against the complexity of exchanging complex state information.

Synchronizing cookies will allow a single user's account/session to be used in a co-browsing session. However, not all web applications will work with synchronized cookies, and thus this option may be disabled if desired.

Each client will perform this process in parallel, so that each client obtains its own version of the content associated with URL 1 from web server 19 and uses the state information to synchronize its view of the web page with the other users' views of the web page. Since each client is obtaining the content directly from the web server, the virtual environment server is not required to obtain the content or pass the content to each of the users. This reduces the bandwidth requirements of the virtual environment server to make it easier for the virtual environment server to include dynamic content in the virtual environment. Additionally, the processing power associated with including content may actually be reduced, since the virtual environment server is not required to use the content to create a texture for the three dimensional surface, but rather simply associates a URL with the surface.

Assume that the content associated with URL-1 included a link to URL-2, and that one of the users 12 elects to use the link to view the second URL. In the example shown in FIG. 1, it will be assumed that the user 12 that is shown in greater detail is the user that selects the second URL. When the user clicks on the link or otherwise selects the second URL, the virtual environment client will receive the input via the user interface 26 and send the new URL to the web browser (Arrow 2). The web browser will obtain the content from the web server, render it into the buffer, where it will be retrieved and rendered into the virtual environment. The process of obtaining content associated with a URL and rendering it onto a three dimensional surface was explained above. Clicking on the URL will also update state information in the web browser.

When the user clicks on a URL to obtain a new web page and update the web browser state, the virtual environment client will send a message containing the new URL, updated browser state, and the virtual environment coordinates (or other identifying information) associated with the URL to the virtual environment server (Arrow 7). Upon receipt of the new URL and updated state information, the virtual environment server will pass the new URL and updated state information to each of the other clients (Arrow 8). When the clients receive the new URL and updated state information, they will interact with the web server to obtain the content associated with the new URL. The updated state information will be used to synchronize the browsers with the first user who clicked on the URL. Thus, the content shown on the 3D surface may be synchronized between users.

The URL may be located in a particular location or, alternatively, may be synchronized between areas within the virtual environment. Thus, for example, the URL may be associated with both the oval billboard 40 and the sign 42. Similarly, the URL may be associated with screens in multiple areas of the virtual environment so that one person may manipulate web content in one area and cause the content to be viewable in multiple other areas of the virtual environment. Thus, the web content may enable people in disparate areas of the virtual environment to view similar content and, accordingly, to communicate visually with each other even though they are not proximate each other.

Figure 5:
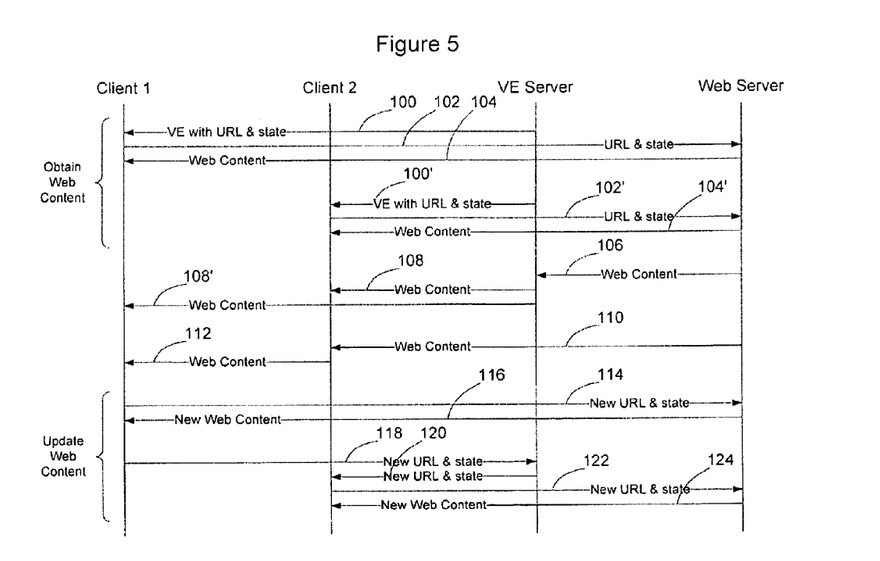
FIG. 5 is a flow diagram showing the interaction between clients, virtual environment servers, and web servers, in an embodiment in which web content of a web browser is to be included in a virtual environment according to an embodiment of the invention.

FIG. 5 shows a flow diagram illustrating how content may be integrated into a virtual environment according to an embodiment of the invention. As shown in FIG. 3, the virtual environment server will generate a URL-embedded virtual environment and pass the URL-embedded virtual environment to each of the clients (100, 100'). Each client will contact the web server (102, 102') to obtain a copy of the web content (104, 104'). As mentioned above, although in this embodiment the clients are all obtaining the content from the web server directly, the content may be distributed in another manner as well, such as by having the web server pass the content to the virtual environment server (106) for distribution to the clients (108, 108'), or by having the web server pass the content to one of the clients for distribution to the other clients (112). As noted above, there are many ways of distributing content on a communication network and the invention is not limited to any particular way in which this aspect is implemented.

If one of the clients interacts with the content that results in selection of a new URL (114), the new URL and state information will be sent to the web server to cause new web content to be downloaded to the client (116). The new URL and state information will also be transmitted to the virtual environment server (118) to enable the new URL and state information to be synchronized by the virtual environment server to all other clients (120). When the other clients receive the new URL and state information, the clients will pass the new URL and state information to the web server (122) to obtain the new web content (124).

Although an embodiment has been described in which the content to be integrated into the virtual environment was web content, the invention is not limited in this manner as output from other applications may be used as well. For example, assume that one of the users is running an application such as a computer aided design application that is hosted by a server on the network. The output of the application may be streamed to the users and stored in the buffer 27. When needed, the virtual environment clients 24 may then use the content and render the content onto the three dimensional surface in the virtual environment. Thus, the output of any number of applications may be provided in the three dimensional virtual environment by causing the clients to buffer screen data for the applications that may then be locally rendered by the virtual environment client onto one or more surfaces of the three dimensional computer-generated virtual environment.

Although particular modules and pieces of software have been described in connection with performing various tasks associated with enabling external content to be included in a three dimensional computer-generated virtual environment, the invention is not limited to this particular embodiment as many different ways of allocation functionality between components of a computer system may be implemented. Thus, the particular implementation will depend on the particular programming techniques and software architecture selected for its implementation and the invention is not intended to be limited to the one illustrated architecture.

The functions described above may be implemented as one or more sets of program instructions that are stored in a computer readable memory and executed on one or more processors within on one or more computers. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a memory chip, computer memory, memory stick, disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A computer-implemented method of including web content in a three-dimensional computer-generated virtual environment, the method comprising the steps of:
running a first virtual environment client on a first computer;
receiving, by the first virtual environment client from a virtual environment server, a first Uniform Resourced Locator (URL) and first browser state defining the web content that is to be associated with a three dimensional surface at a first location in a virtual environment implemented by the first virtual environment client when a first Avatar associated with a first user is proximate the first location in the virtual environment;

passing the first URL and first browser state from the first virtual environment client to a first web browser running on the first computer;

obtaining, by the first web browser, the first web content associated with the first URL and first browser state;

passing the first web content from the first web browser to the first virtual environment client;

rendering, by the first virtual environment client, the first web content onto the three dimensional surface at the first location in the three dimensional computer-generated virtual environment to allow the first user to view the first web content on the three dimensional surface at the first location in the virtual environment;

receiving input, by the first virtual environment client from the first user, the input specifying a second URL that is to be associated with the three dimensional surface at the first location in the virtual environment;

passing the second URL from the first virtual environment client to the first web browser;

obtaining, by the first web browser, second web content and second browser state associated with the second URL;

passing the second web content and second browser state from the first web browser to the first virtual environment client;

passing the second URL and second browser state, but not the second web content, from the first virtual environment client to the virtual environment server;

forwarding, by the virtual environment server, the second URL and second browser state to virtual environment clients of other users of the virtual environment when avatars associated with the other users of the virtual environment are proximate the first location in the virtual environment to enable the other users to independently obtain the second web content to be displayed on the three dimensional surface at the first location in the three dimensional computer-generated virtual environment.

2. The method of claim 1, wherein the first web content is obtained by the first web browser independently of the first virtual environment client.

3. The method of claim 1, wherein the first web content is obtained from a web server independent of the virtual environment server.

4. The method of claim 1, wherein the first URL and first browser state are obtained by the first virtual environment client from the three dimensional surface.

5. The method of claim 1, wherein the first browser state includes a set of cookies.

6. The method of claim 5, wherein the first browser state further includes JavaScript variables.

7. The method of claim 1, further comprising the step of receiving, by the virtual environment server, a third URL and third browser state from a second user, the third URL and third browser state to be associated with the three dimensional surface in the virtual environment.

8. The method of claim 7, further comprising the steps of forwarding, by the virtual environment server, the third URL and third browser state to the first virtual environment client;

passing the third URL and third browser state from the first virtual environment client to the first web browser;

obtaining, by the first web browser, the third web content associated with the third URL and third browser state;

passing the third web content from the first web browser to the first virtual environment client;

rendering, by the first virtual environment client, the third web content onto the three dimensional surface at the first location in the three dimensional computer-generated virtual environment to allow the first user to view the third web content on the three dimensional surface at the first location in the virtual environment.

9. A method of enabling multiple users of a virtual environment to have access to web content as the users encounter web content locations within the virtual environment, the method comprising the steps of:

associating a first URL and first browser state with a three dimensional surface implementing a web content location within the three dimensional virtual environment;

transmitting the first URL and first browser state to a first user virtual environment client, the first URL and first browser state being transmitted along with parameters describing the three dimensional surface as a first Avatar representing the first user encounters the web content location within the virtual environment to cause the first user virtual environment client to obtain first web content associated with the first URL and first browser state and display the first web content on the three dimensional surface;

receiving a second URL and second browser state from a second user virtual environment client in connection with interaction between a second Avatar representing a second user and the three dimensional surface in the virtual environment; and transmitting the second URL and second browser state to the first user virtual environment client to cause the first user virtual environment client to obtain second web content associated with the second URL and second browser state and display the second web content on the three dimensional surface.

10. The method of claim 9, wherein the first URL enables users of the three dimensional virtual environment to obtain the first web content associated with the first URL from a first web server unaffiliated with a server supporting the virtual environment, wherein the parameters describing the three dimensional surface enable the web content to be mapped into the virtual environment, and wherein the first browser state enables the first and second users to have a synchronized view of the web content within the virtual environment.

11. The method of claim 9, wherein the second browser state includes a set of cookies.

* * * * *